United States Patent [19]

Perchthaler et al.

[11] Patent Number: 5,176,189

[45] Date of Patent: Jan. 5, 1993

[54] DEVICE FOR TRANSPORT OF MATERIAL BETWEEN CHAMBERS AT DIFFERENT PRESSURES AND PROCESS FOR OPERATION OF THIS DEVICE

[75] Inventors: Heinz Perchthaler, Graz, Austria; Franz Krappmann, Grunwald, Fed. Rep. of Germany

[73] Assignee: Maschinenfabrik Andritz Actiengesellschaft, Graz, Austria

[21] Appl. No.: 550,743

[22] Filed: Jul. 10, 1990

[30] Foreign Application Priority Data

Jul. 13, 1989 [AT] Austria .................. 1696/89

[51] Int. Cl.$^5$ .................................................. B65G 65/40
[52] U.S. Cl. .................................... 141/98; 141/85; 141/287; 414/221; 222/750; 137/240; 137/242; 251/159; 251/172
[58] Field of Search .................. 141/67, 98, 59, 65, 141/85, 89, 287; 414/221, 217; 222/450; 251/159, 172, 329, 328; 137/240, 242; 277/24, 34, 58, 71, 72 R, 75

[56] References Cited

U.S. PATENT DOCUMENTS

| | | | |
|---|---|---|---|
| 1,868,147 | 7/1932 | Kruse | 251/172 |
| 2,904,306 | 9/1959 | Bryant | 251/329 X |
| 3,190,509 | 6/1965 | Kirchhoefer | 414/221 X |
| 3,266,525 | 8/1966 | Wohter | 251/159 X |
| 3,367,625 | 2/1968 | Fortune | 251/172 |
| 3,371,493 | 3/1968 | Woolley | 251/172 X |
| 4,060,183 | 11/1977 | Puurunen | 222/450 X |
| 4,163,458 | 8/1979 | Bachmann | 137/240 |
| 4,338,960 | 7/1982 | Ashdown | 137/240 |
| 4,483,509 | 11/1984 | Lewcock et al. | 251/329 X |
| 4,491,144 | 1/1985 | Dreyer et al. | 137/240 |
| 4,509,717 | 4/1985 | Wright et al. | 251/159 X |
| 4,561,472 | 12/1985 | Dreyer et al. | 251/172 X |
| 4,562,992 | 1/1986 | Sugisaki et al. | 251/159 |
| 4,830,233 | 5/1989 | Thelen et al. | 222/450 |
| 4,856,551 | 8/1989 | Brakelmann | 137/240 X |

FOREIGN PATENT DOCUMENTS 2459979 7/1975 Fed. Rep. of Germany ...... 414/221

Primary Examiner—Henry J. Recla
Assistant Examiner—Casey Jacyna
Attorney, Agent, or Firm—Roylance, Abrams, Berdo & Goodman

[57] ABSTRACT

A device for transport of material between chambers at different pressures, comprises a feed chamber, a main chamber having an upper housing with an inlet and a lower housing with an outlet. The feed chamber is coupled to the main chamber at the inlet, and a first slide valve opens and closes the inlet. A second slide valve for opening land closing the outlet may be provided. At least one hollow gasket with an essentially closed wall, preferably an inflatable gasket, is provided between the upper housing and the first slide valve for sealing the inlet; and, at least one gasket with an essentially closed wall, preferably an inflatable gasket, may be provided between the lower housing and the second slide valve for sealing the outlet. Alternatively, a first flap valve for opening and closing the inlet is provided which is pivotally coupled to the upper housing at one side. At least one hollow gasket with an essentially closed wall, preferably an inflatable gasket, is coupled between the upper housing and the first flap valve for sealing the inlet.

26 Claims, 8 Drawing Sheets

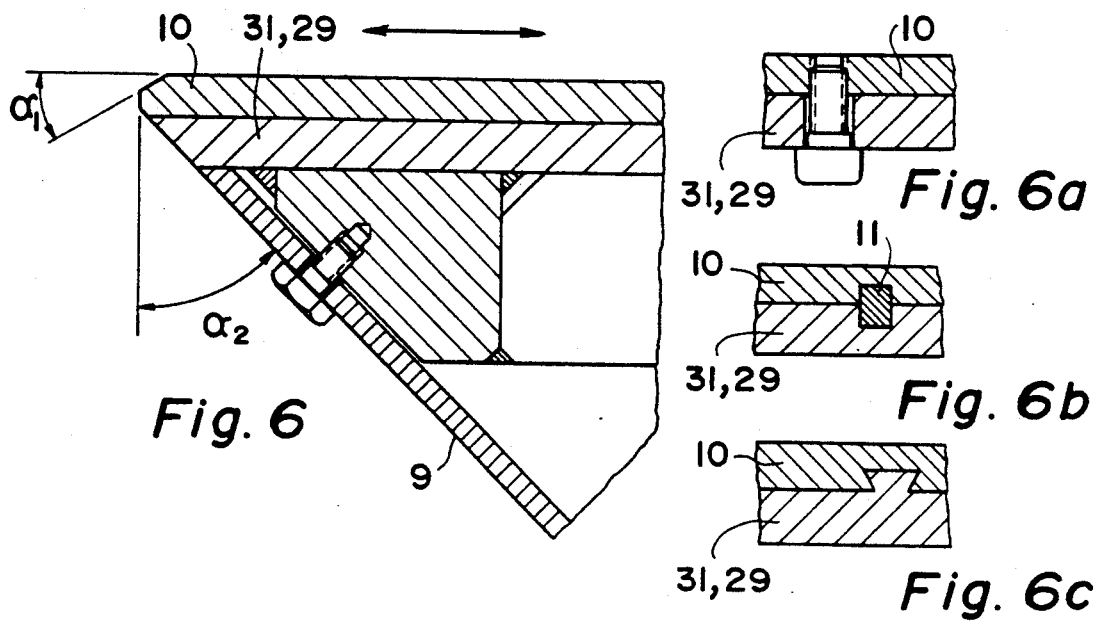
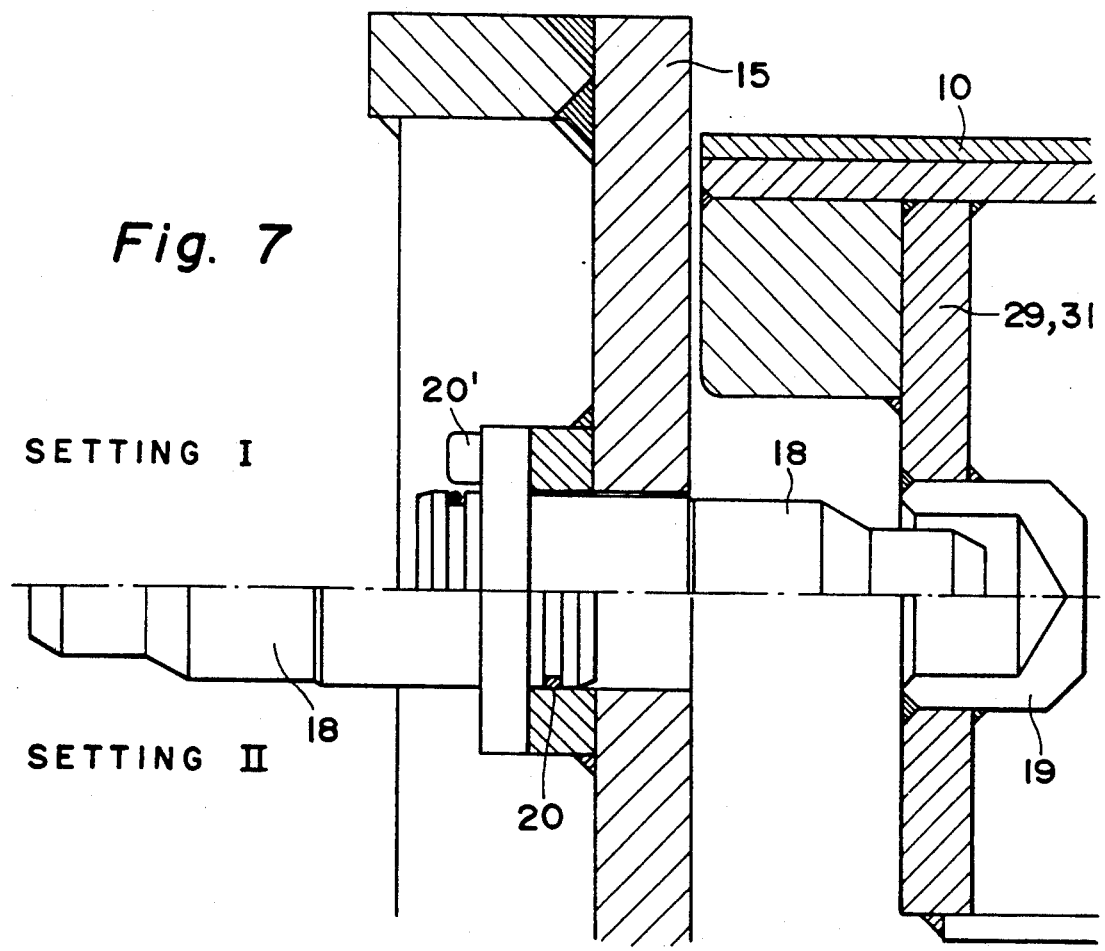

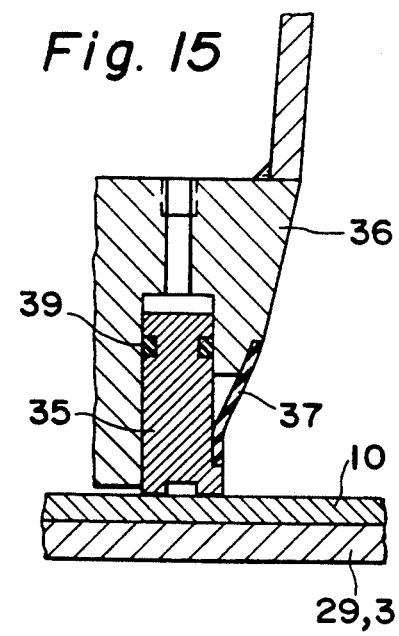
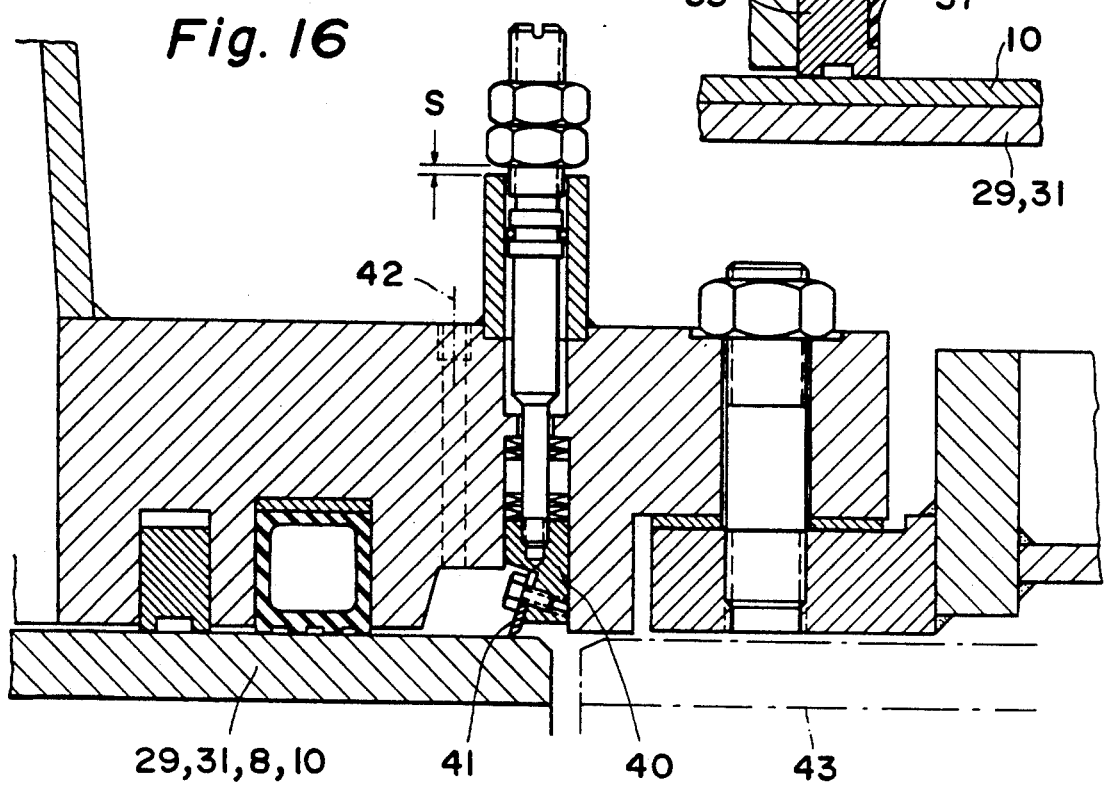
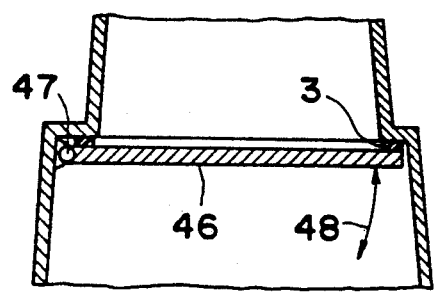
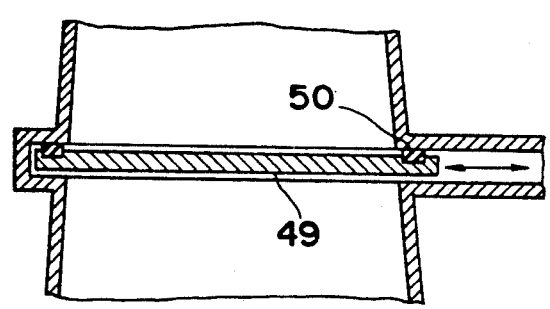

DEVICE FOR TRANSPORT OF MATERIAL BETWEEN CHAMBERS AT DIFFERENT PRESSURES AND PROCESS FOR OPERATION OF THIS DEVICE

FIELD OF THE INVENTION

This invention relates to a device and process for using a device for transport of material between chambers which are at different pressures having at least one lock or chamber with an inlet and outlet which are opened and closed by at least one slide valve per opening and/or one flap valve per opening. The slide valve is moved out of the chamber into a slide valve housing which is provided to the side of the chamber and is sealed off from the outside, or the flap valve can be pivoted approximately in the direction of discharge of the material, especially in an area of a widening of the wall of the chamber. At least one hollow gasket which may be inflatable, located outside the area through which the material flows, seals the slide valve or the flap valve in a locked setting.

BACKGROUND OF THE INVENTION

Many different chamber lock arrangements are used to transport material through sealed pressure chambers. For example, a dewatering machine having a pressured vessel for treating filter cake resulting from, for example, metal-ore concentrates, requires a decompression chamber to allow the filter cake to pass through an area of atmospheric pressure before release from the system. Assemblies are used comprising a receiving chamber and a storage chamber or an air cell which are hermetically separated by mechanical shutoff devices. The chamber arrangements with slide valves used until this time use two slide valve halves moving in opposite directions, which meet in the middle. These assemblies work satisfactorily only up to differential pressures of approximately 2 bars with regard to the gas consumption. At higher differential pressures high leakage losses occur as a result of insufficient capacity for sealing.

SUMMARY OF THE INVENTION

The object of the invention is to reduce to a minimum the leakage losses which occur at high pressure and high pressure differentials. With the present invention, the gaskets are hollow with closed walls and consist of flexible, elastic, material. The hollow chamber of the gasket may be connected to a pressure medium source, especially a compressed air source, and the pressure medium is introduced into and removed from this hollow chamber by a pump, for example, and is held thereby a shutoff member, such as a valve in the air supply pipe. The gaskets may be constructed to be inflatable and evacuable, to supply the suitable compression force to seal the valve yet to avoid unnecessary wear or resistance for the movement of the slide valves or flap valves during the opening and closing movement. Alternatively, the hollow gasket may have a suitable gas sealed in the hollow space and may be compressed by mechanical means. One single or two slide valves moving in opposite directions or one or two flap valves suspended on opposite sides can be used as the closing member. Sealing against leakage losses is obtained by any one or combination of the following arrangements: the gasket can be placed on the valve plates from above, against the valve plates from below, against the foundation of the slide valves or flap valves as well as in the slide valves or flap valves or around the periphery of the slide valves or flap valves to effectuate sealing.

With the use of hollow gaskets, the dimensions of the opening can be varied as desired. The shape can vary from a rectangle, a video-screen shape, or a circular cross section. One further advantage of the invention is that the sealing surfaces can be provided outside of the material passage and therefore the susceptibility of the device to contamination is kept quite low. The hollow gaskets, whether located on the material input side, on the side turned away from the material input or on the slide valve or flap valve periphery, contact the valve and the wall of the chamber at least in the locked position, and are annular thereby surrounding the material channel.

In order to avoid contamination occurring on the top of the slide valve or on the surface of the side turned toward the material source, scraper blades are utilized. A scraper blade surrounding the material channel in the form of a ring is arranged in the chamber wall between the material channel and the hollow gasket. For the purpose of assuring a scraping effect, the scraper is resiliently mounted and adjustable, preferably from the exterior of the chamber. A plurality of adjustment means, especially adjustment bolts, are provided for adjustment or readjustment of the scraper from the outside, and pass sealed through the chamber wall. As a further variation, it may be advantageous to install scrapers having flexible or elastic tubes. The tubes are connected to a source of pressurized medium for adjustment and readjustment of the scrapers. One embodiment of the device provides an additional adjustable scraper and a recess in the chamber wall, between the hollow gasket and additional scraper, which is connected with a flushing or scavenging medium source to flush out the scraped material accumulated in the recess.

Specific adjustment to the material passed through the chamber and the various operational states of the system can be accommodated by the hollow gaskets since they are adjustable, particularly from the outside. For the purpose of adjustment, the hollow gaskets have a plurality of sealed adjustment means, especially adjustment bolts, passing through the chamber wall. Holding means, especially a holding ring or the like, is tightly connected with the hollow gasket when adjustment bolts are used.

To aid in the cleansing and to prevent caking of material, the surface of the lock members (slide valves, flap valves) are provided with abrasion plates of suitable material. Consequently, the slide or flap valves on the material input side or the side of the hollow gasket have an interchangeable abrasion plate, made of a material with a hard, wear-resistant, nonoxydizable surface. The plate can be made of a highly refractory, heat-treated and wear-resistant steel of great hardness (Hardox), of steels with special surface treatment, such as boriding or plasma nitrating of the surface, or provided with sintered or plated surfaces. The abrasion plate can be sheared off at an angle at the front of the slide valve turned toward the material channel on the material input side. This shearing off has the advantageous effect that it attains a lifting off of the scraper when the slide valve is closed.

For operation of the device, the slide valves are supported on support rolls or rollers, and can also be guided by side rollers, which are mounted countersunk in the slide valve body.

In order to separate or cut off the material or product being fed into the chamber, especially a filter cake, the slide valve front side is beveled and suitably equipped with a cover plate. The bevel edge incorporates an acute angle with the axis of the material channel, especially an angle of or greater than 40°. This given angle degree is especially favorable to eliminate undesired pressing against the chamber wall.

It is also advantageous that at least one safety bolt per slide valve is detachably mounted and sealed to secure the position of the pulled-back slide valve, wherein the bolt is engaged and locked in a recess of the slide valve body to secure an open position. A detachable anchoring of the seating of the safety bolt serves to secure the position of the slide valve and also to release the slide valve. Thus, undesired locking of the slide valve over the chamber during installation and/or repair work is prevented.

For practical operation of the device, the slide valves are operated by a hydraulic cylinder or the like. Beneath the cylinder, sliding devices such as rollers or sliding blocks are provided to facilitate sliding of the valve toward the chamber. A ventilation pipe is also provided in the wall of the material channel in the chamber for a cleansing effect and to prevent caking of solid material on the chamber wall.

Alternatively, flap valves are used wherein the flap valve, especially if they are rectangular in plan view or quadratic plates, can be pivoted to one side. The flap valves are mounted on hinges or the like and are preferably located on or in widened out or widening areas, especially conical walls, of the material channel. In this case any interference of the material passage or throughput flow when the flap valve is in open setting is generally avoided.

In practice, the hollow gasket consists of elastic material received in a groove adjacent to the slide valve or flap valve. Following release of pressure in the gasket, the hollow gasket recedes into the groove, which facilitates movement of the slide valve or flap valve.

It is also possible to make up the hollow gasket of two or more component parts, which together form a gasket which is essentially self-contained. In this case, it is only required to get the desired sealing effect in an extent satisfactory for practice.

In operation, the hollow gaskets are placed under pressure while the input and discharge openings are closed. Specifically, the hollow gaskets are compressed or connected to a compressed air source and then the chamber is brought under pressure which is identical to the pressure (a positive pressure, vacuum pressure or atmospheric pressure) of the material source, for example a pressure chamber or air-pressure tank, by means of temporary connection of the chamber with the material source. The gaskets of the slide valves or flap valves, especially gaskets on the material source sides, are balanced by release of pressure or by being ventilated or evacuated, and then opened. Following the introduction or dropping in of the material in the chamber, the slide valves or flap valves on the material source sides are again closed and the associated hollow gaskets are again placed under pressure, then the chamber is brought to the pressure level, such as atmospheric pressure, of the subsequent chamber in the direction of movement of the material, subsequently the hollow gaskets of the slide valves or flap valves at the bottom of the chamber are decompressed or made devoid of pressure by evacuation, and are opened, and finally, following removal or dropping out of the material, the aforementioned slide valves or flap valves are again closed and the associated hollow gaskets placed under pressure. This process can be run by a timer.

The invention is explained hereinafter relative to the exemplary embodiments, in the drawings of which the identical or similar component parts of the device are provided with identical references.

DRAWINGS

FIG. 1 is an entire diagrammatic representation in partial cross section of the chamber, the slide valves and their operation cylinders and guide devices, and the slide valve housings;

FIGS. 2 to 9 include details of various variations of embodiments of the assembly;

FIGS. 11 to 16 show further details of various embodiments;

FIG. 17 is a variation with pivotable flap valve;

FIG. 18 is similar to FIG. 17 with a hollow gasket inserted in the slide valve;

DESCRIPTION OF THE PREFERRED EMBODIMENTS

Figure 1:
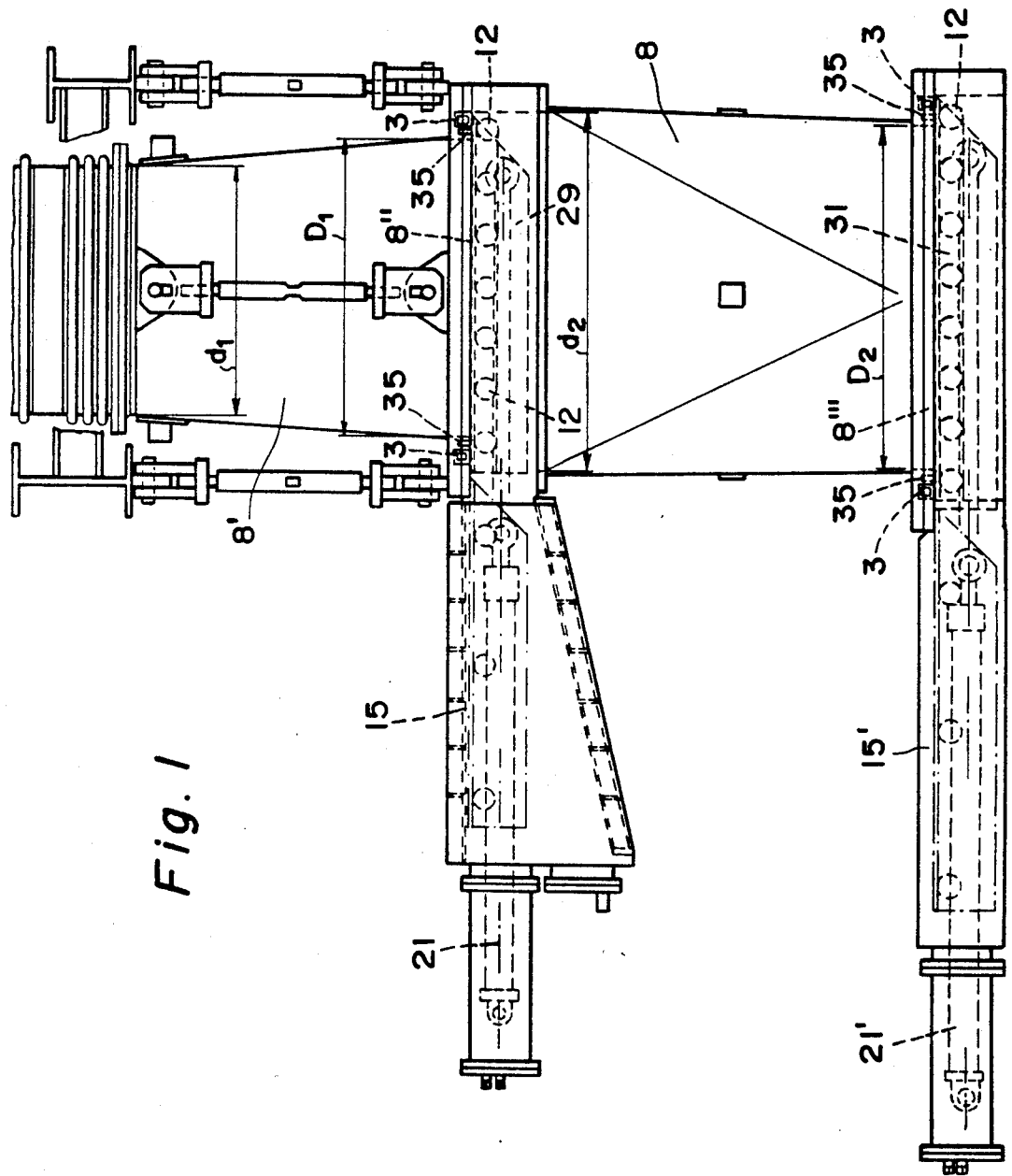

In FIG. 1, the material is being fed from a compression chamber of a dewatering machine through the introduction feed pipe 8' of chamber 8, of which the input opening or inlet 8" can be closed off by the one-part slide valve 29, and of which the discharge opening or outlet 8'" can be closed off by the one-part slide valve 31. Both openings are surrounded and sealed by hollow gaskets 3, which are self-contained, especially as an annular ring similar to a bicycle wheel tube. The input opening 8", with an axis which coincides with the axis of the annular gasket, has a generally rectangular cross section. Deviations from the annular shape arise when feed pipes, chamber and so forth deviate from the circular shape. They must then surround the modified inside chamber, particularly at a more or less considerable distance therefrom on the outside. Instead of the rectangular dimensions, a circular cross section or any shape in between these two could also suffice, and also a video screen shape cross section. In plan view this hollow gasket 3 can be a circular closed ring, can have a rectangular shape, can have outside edges almost identical to those of a video screen or can be an amalgam of such shapes. Both of the slide valves are operated by means of hydraulic cylinders 21, 21' and are supported and guided by means of rollers 12. Inside scrapers 35, which may also be configured to be annular in plan view, surround the material channel and are arranged between the material channel and the hollow gasket 3. Housings 15 and 15' are provided for the two slide valves, into which the slide valves are drawn when in open setting. These housings can be pressure housings sealed off from the outside. The material channel increases in size in the direction of material throughput from input pipe 8' with its entrance diameter of $d_1$, its discharge diameter of $D_1$, the entry opening 8" of chamber 8 with the entrance diameter of $d_2$, and discharge diameter of $D_2$, at 8'''. Further details and component parts of the device are described hereinafter.

Figure 2:
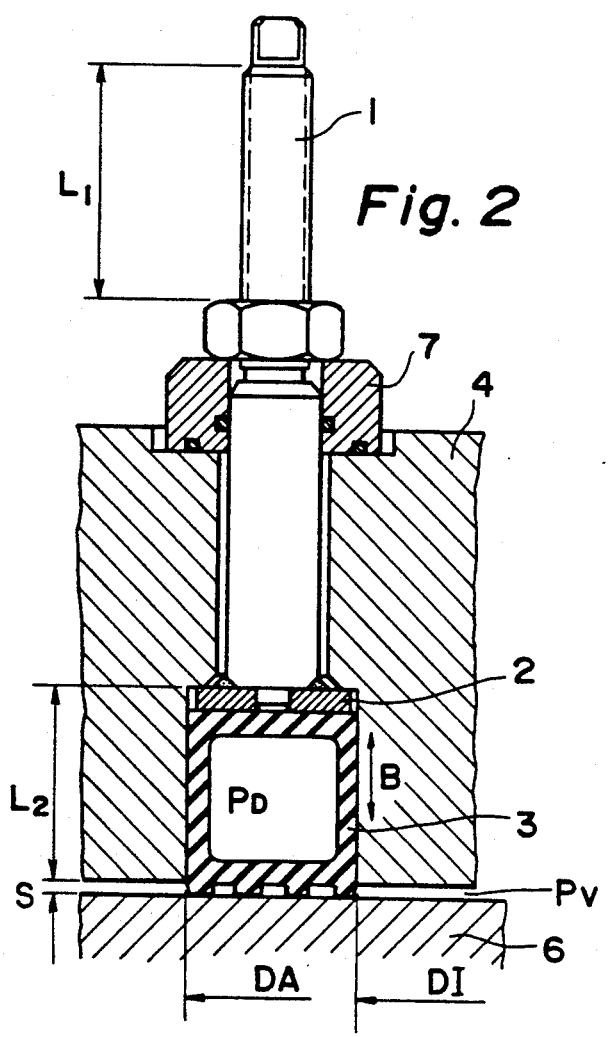
Figure 2A:
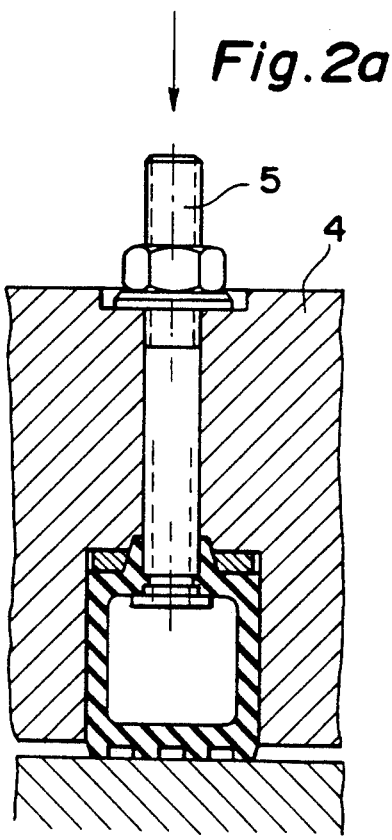

FIGS. 2, 2a, 3 and 3a clarify the gasket or packing system in detail. As shown in FIG. 2, clamping bolts 1 are connected through a holding ring 2 with elastic hollow gasket 3, and a portion of either pressure housing 15, 15' or chamber 8 serves as gasket support 4. According to FIG. 2, the clamping bolt 1 is threaded for adjusting the position of the closed hollow gasket 3 and is screwed down to compress gasket 3 against valve surface 6. Hollow gasket 3 engages on the countersurface 6 of slide valve 29 or 31 which is to be sealed off. For sealing off from the environment still another sealing ring 7 is provided. The clearance S is bridged over by means of gasket 3 and thus is sealed. Gasket 3 can be moved in the direction B. According to FIG. 2a, an air feed valve 5 runs through tube 76 to inflate and deflate gasket 3 and connects to an air supply system 78 having a shutoff valve 80. Air feed valve 5 connects to supply system 78 through an inlet in tube 76, through support 4 or at any convenient location adjacent to 76. FIG. 2a shows an alternate embodiment in which the holding ring 82 and packing ring 84 are modified. Alternatively, the air feed valve 5 could also serve as gasket support, which however is less favorable. A gaseous medium is blown into the hollow space of elastic gasket 3 through the feed valve 5 at pressure $P_D$. Pressure $P_D$ is greater than pressure $P_V$ being generated in the inside chamber or processing chamber of the lock.

In order to prevent gasket ring 3 from sliding out, the ring is connected tightly at the front (circular ring surface) with the holding ring 2, it is for instance prevulcanized. Holding ring 2 is connected securely with a plurality of clamping bolts, for instance is welded, bonded or glued, rivetted therewith or secured by means of threads and so forth. Clamping bolts 1 must be packed and sealed from the outside environment. This can be attained for instance by means of packing ring 7 or some other packing or sealing variations. In order to produce a favorable assembly, L1 should preferably be at least as long as or longer than L2. Gasket ring 3 can preferably be circular, as seen in plan view, or can be of any other shape, and is provided with ridges for multiple sealing surfaces. Quadratic or rectangular shapes with rounded edges are also possible.

Figure 3:
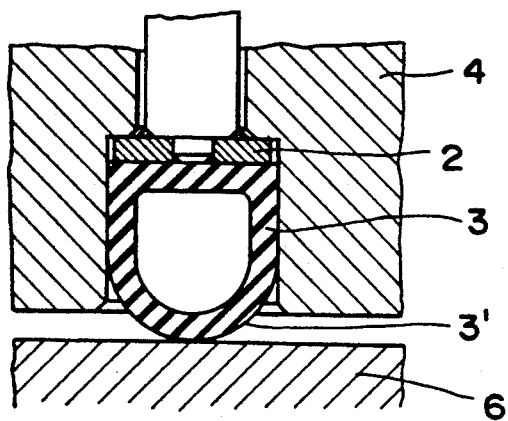
Figure 3A:
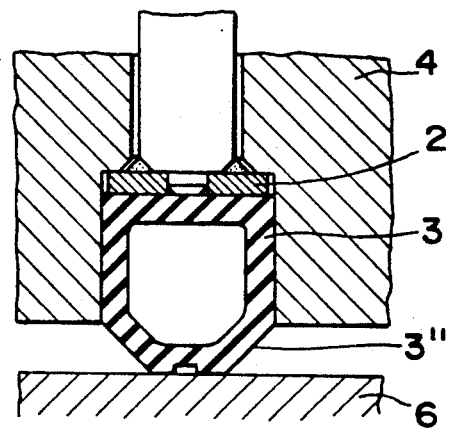

FIGS. 3 and 3a show cross sections of modified gasket rings, in which it is most important that ring surface 3', 3'', turned toward the slide valve surface 6, project somewhat, especially that it be configured to be cambered or bulging and/or roof-shaped.

Figure 4:
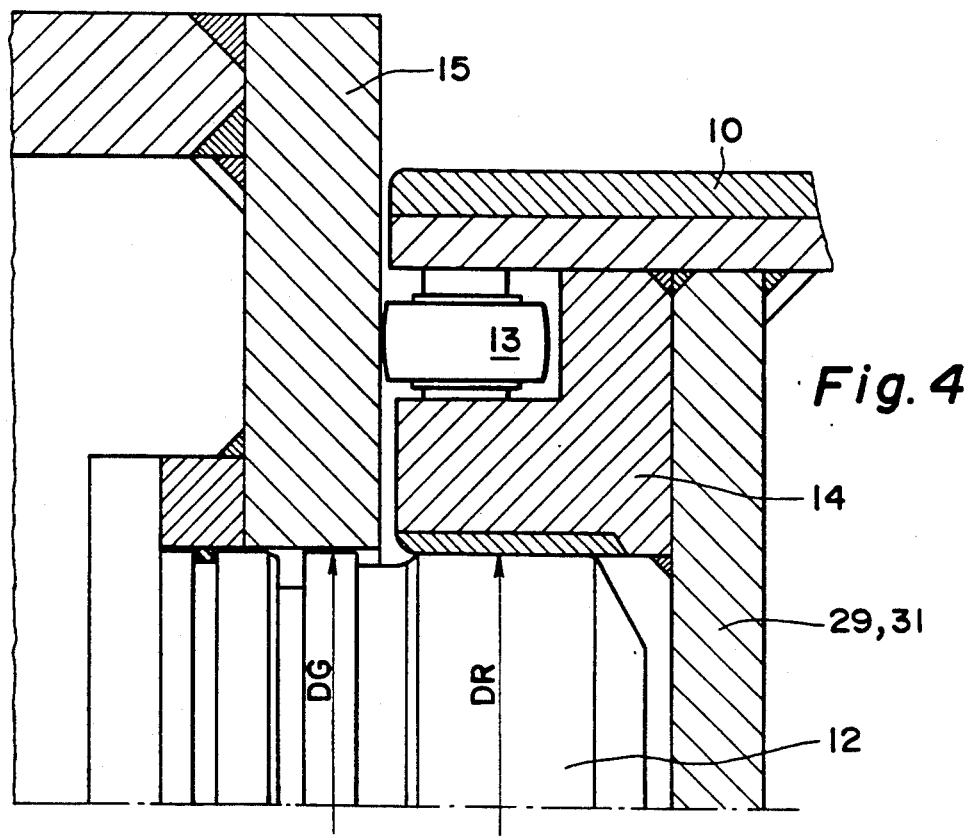
Figure 5:
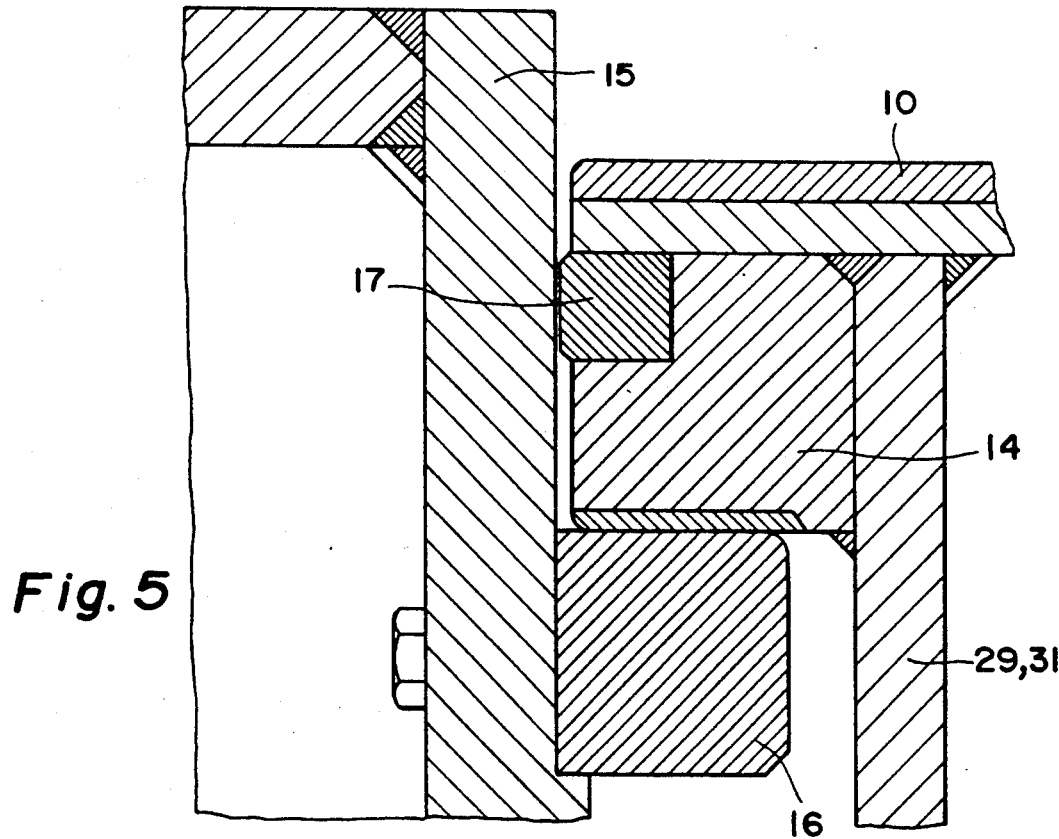

FIGS. 4 and 5 show the arrangement of slide valves 29, 31 on the support rollers 12 or support strips or support blocks 16 in cut-out views. In this case, the slide valves are provided with an abrasion or wear plate 10 and annealed rollers 13 or side guide strips 17 or guide blocks which are present on the sides for the slide valve. A slide valve support strip 14 with a hard slide path is also provided. The slide valve housing or pressurized housing is indicated as 15, the housing diameter is DG and the support roll diameter is DR. Slide valves 29, 31 are moved on pluralities of support rollers 12. The support rollers are interchangeable from the outside, since DG is slightly larger than DR. Slide valves 29, 31 are generally guided by annealed rollers 13 or guide strips 17 at the side. Support strips or blocks 16 can also be embodied so that they are interchangeable from the outside.

FIGS. 6, 6a, 6b and 6c show detailed embodiments of the slide valve in partial lengthwise and partial cross sections. In this arrangement, a cover plate 9 is provided, which advantageously is removable, in order to affix the piston rod of the hydraulic cylinder 21, 21'. Abrasion or wear plate 10 is also interchangeable. A transverse strip 11, as shown in FIG. 6b, can be arranged therein to fasten the parts together. A diagonal or trimmed edge with the angle alpha will effectively guarantee raising the scraper 35 during closing of the slide valve (during the function "close slide valve"). The diagonal alpha: of cover plate 9 or the front of the slide valve is identical to or greater than 40°, in order to "cut down" the product being continuously produced (filter cakes) while passing through the chamber, since the material would be pressed through the slide valve plate 10 onto the front wall, if alpha$_2$ is the same as or smaller than 40°. Slide valve plate 10 is of wear-resistant material or has a wear-resistant surface. The material preferably has a hard, wear-resistant, nonoxydizable surface. Slide valve plate 10 is attached to slide valve 29, 31 by means of a detachable connection. The connection can be additionally reinforced in order to be able to absorb axial forces. Variations of the detachable connections could be screws, threaded headless screws or stud bolts and so forth, as well as plug connections such as grooves, dovetail connections, whereby these are arranged at a right angle to the movement of the slide valve.

Another configuration of the device is shown in FIG. 7 which is a mechanical slide safety catch. A safety bolt 18, slide valve engagement eyelet 19 and a packing ring 20 are provided in this case. This special safety catch arrangement operates as follows: when slide valve 29, 31 is drawn back (slide valve open), during installation or repair work, the safety bolt 18 is brought from setting II (operational setting) into setting I (safety setting, repair setting). In this setting, safety bolt 18 projects into the slide valve engagement eyelet 19; this prevents any undesired further movement of the slide valve. Safety bolt 18 and slide valve chamber or pressure housing 15 are constructed so that safety bolt 18 must always be set. Operation without safety bolt 18 or loosening of the bolt is not possible, since during operation the pressure housing bore must be closed off. In order to bring the safety bolt from setting I into setting II, its fastening catch 20' is released, bolt 18 is withdrawn, is pivoted 180° and is again anchored immovably by means of fastening 20'. The fastening is of very tight construction.

Figure 8:
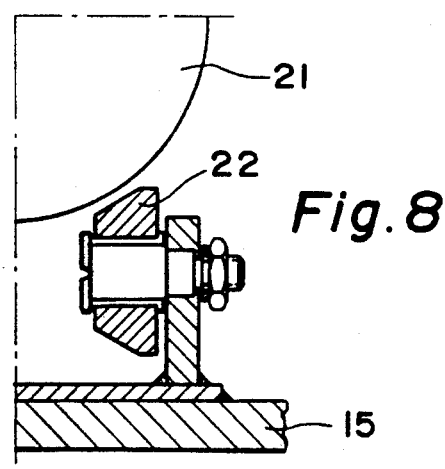
Figure 9:
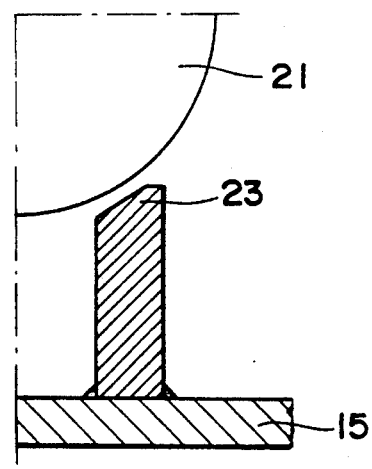

As shown in FIGS. 8 and 9, an auxiliary device for cylinder installation and disassembly is incorporated in the device. The cylinder is indicated as 21, a roller as 22 and a slide block as 23. Roller 22 and slide block 23 serve as support during mounting or dismounting. Following disassembly of the front cylinder bolt, cylinder 21 is lowered onto the sliding arrangement (roller 22 or slide block 23) and can thus be moved out of pressure housing 15.

Figure 10:
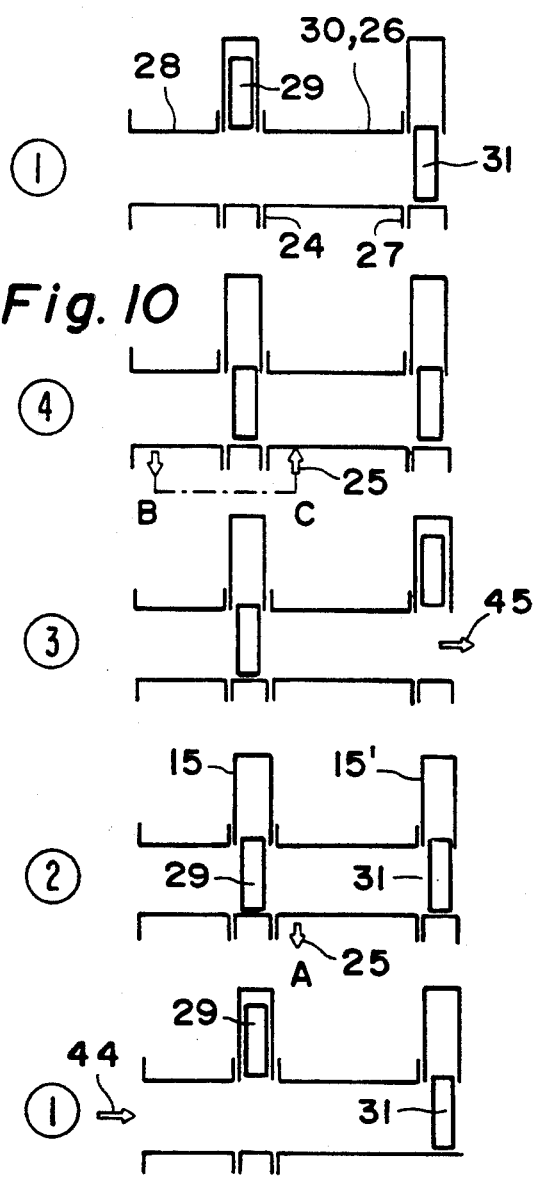
FIG. 10 is a diagrammatic representation of the operational performance.
Figure 11:
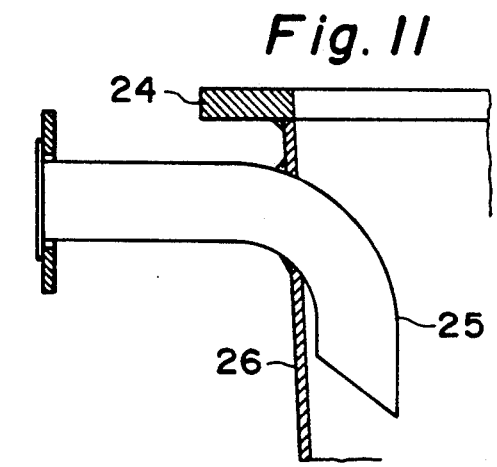
Figure 11A:
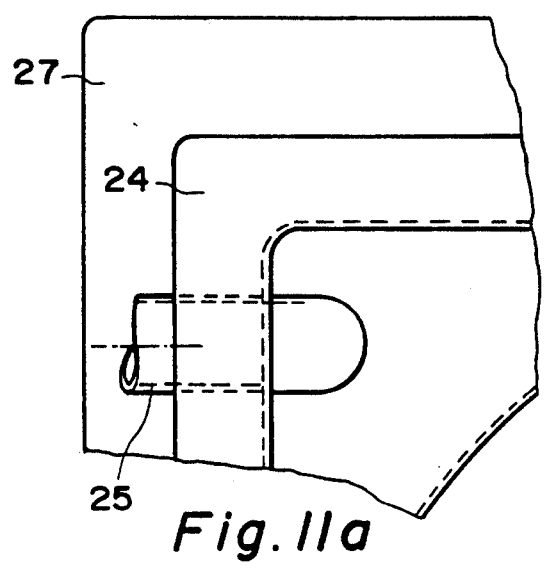

The cycle of slide action (FIG. 10) and arrangement of the ventilation connections (FIGS. 11, 11a) are described as shown in FIGS. 10, 11 and 11a. In this case, 24 is the top flange of the chamber or of bottom conical inlet 30, 25 is the ventilation pipe, 26 is the wing fillet or transition piece of the chamber, 27 is the bottom flange of the chamber or of bottom conical inlet 30, 28 is the top conical inlet for the feed pipe 8', 29 is again the top slide valve, 30 is the bottom conical inlet and 31 the bottom slide valve. Also, A is ventilation into the atmosphere and B is the pressure equilibrium of the reservoir or pressure or material feed container to C (bottom inlet into the chamber). The arrangement of ventilation pipe 25 (FIGS. 10, 11, 11a) causes a cleansing effect during the "④" cycle (FIG. 10), and prevents the caking of material either in the lock container or the transition piece 26. The material feed or feed of solid material is indicated by arrow 44, the material removal or disposal by arrow 45. The slide valve housings are indicated as 15, 15'. The operational settings of the slide valves during filling and emptying of the chamber are shown with ①, ②, ③, ④.

The chamber (lock cycle) generally operates as follows:

1. First, both top and the bottom slide valves are closed and hollow gaskets 3 are placed under pressure (inflated for example).
2. The chamber or the intermediate container is ventilated until it reaches reservoir pressure (operational pressure).
3. Following pressure release of the hollow gasket of the top slide valve, the slide valve is opened without pressure differential between the containers.
4. The material to be passed through or locked out drops from the top storage container into the chamber or the intermediate container.
5. The top slide valve is closed and the hollow gasket is again placed under pressure.
6. The chamber or intermediate chamber is evacuated to outside pressure (atmospheric pressure).
7. The hollow gaskets of the bottom slide valve are pressure released and this slide valve is opened.
8. The product drops out of the chamber.
9. The bottom slide valve is again closed and the gaskets are pressurized or placed under pressure.
10. A new lock cycle begins.

The lock cycle can operate as a timed sequence. For example, the material to be moved through the chamber, such as filter cake, resulting from filtering a metal-ore concentrate, is held in feed pipe 8' at 45-90 psi for 60 seconds, slide valve 29 is opened to drop the cake onto chamber 8, the chamber and cake are depressured to atmospheric pressure, and the cake is discharged from the system after a predetermined time period.

FIGS. 12, 12a, 13, 14 and 15 show an inside scraping ring. In these drawings, the elastic hollow gasket is again indicated as 3, the slide valves as 29, 31 and the abrasion or wear plate as 10. Element 32 is a holding bolt, 33 a sealing ring, 34 disk springs, 35 the inside scraping ring, 36 a flange with a conical inlet (belonging to feed pipe 8'), 37 an elastic gasket, 38 an elastic hose and finally 39 a seal.

Inside scraping ring 35 cleanses abrasion plate 10 and protects the elastic inflatable gasket 3 from contamination. Disk springs 34 press scraping ring 35 against abrasion plate 10. When the slide valve is closed, a clearance "S" must always be distinguishable. Clearance "S" indicates that disk springs 34 are working. The abrasion or wear of the inside scraping ring is distinguishable at the clearance "S" and can when needed be addressed from the outside. Holding bolts 32 are arranged in plurality around the periphery.

Figure 12:
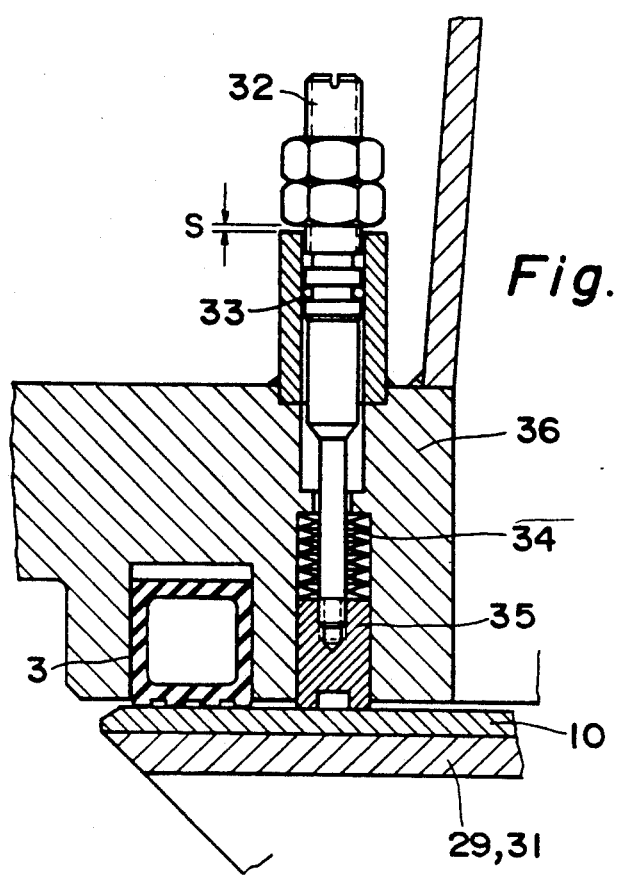
Figure 12A:
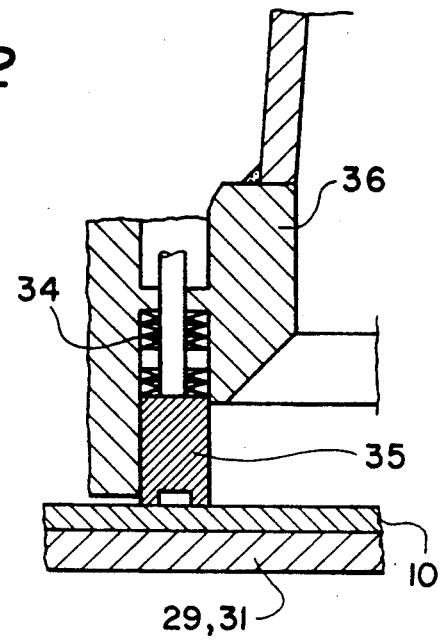
Figure 13:
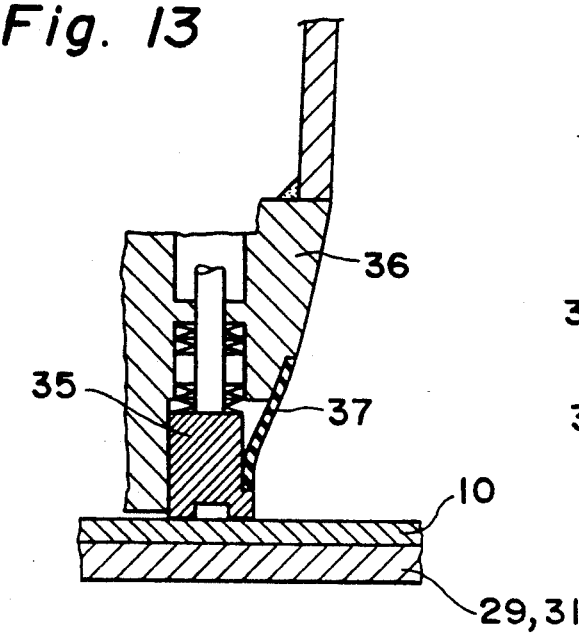

In FIGS. 12a and 13, scraping ring 35 is centered only at its outside periphery. In FIG. 13, an elastic gasket or seal is fastened to the inside to parts 36 and 35, in order to prevent contamination of the pressing device.

Figure 14:
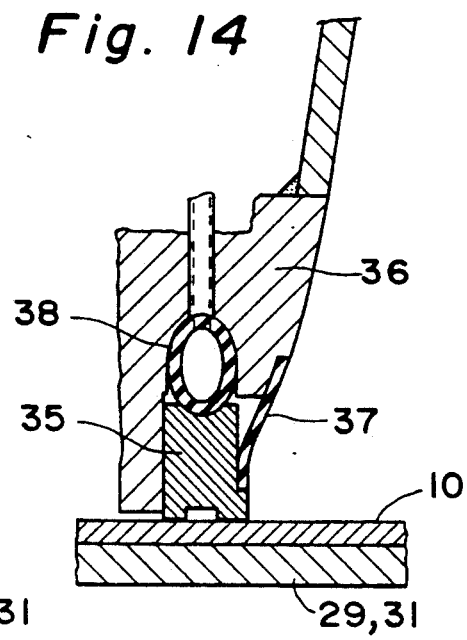

In the variation shown in FIG. 14, the pressing force is produced not by means of disk springs but rather through an inflatable elastic hose 38. This hose 38 can be configured as an endless hose or as a hose segment. As a variation, hydraulic oil can be used instead of air as pressure medium.

As shown in FIG. 15, it is also possible to embody scraper ring 35 as an annular piston. The pressure force is generated by pneumatic or hydraulic means. Here too the adjustment is possible from the outside by means of holding screws 32 (FIG. 12).

Furthermore, FIG. 16 shows that an outside scraper 41 can also be used. In this case, the abrasion plate is again indicated as 10 and the slide valve as 29, 31. The scraper in this case consists of a blade carrier 40 carrying a scraper blade 41; a rinsing connection 42 is also present. The "slide valve open" setting is shown in broken line at 43. The scraped off material, for instance the scraped off filter cake, accumulates before scraper blade 41 in the space which is there accessible. In the "slide valve open" setting 43, the product drops downward. With materials which are inclined to cake, the space before the scraper blade can be rinsed clean through rinsing boreholes 42. The pressing assembly system of scraper blade 41 can also be embodied as in FIGS. 12, 12a, 13, 14 and 15.

The embodiments of the valve and gasket system shown in FIGS. 17-23 utilize a hollow gasket assembly similar to that previously disclosed, in which there may be a passage through the valve hinge or housing wall for inflation of the annular gasket.

In FIG. 17, another construction is shown with pivotable flap valves 46, which are mounted on hinges at 47 and can be pivoted in the direction of the curved arrow 48. The associated hollow gaskets are again indicated as 3 and are preferably again annular in plan view.

FIG. 18 shows a slide valve 49 with hollow gasket 50 inserted into it. In a similar manner, the hollow gasket can also be mounted in flap valves.

Figure 19:
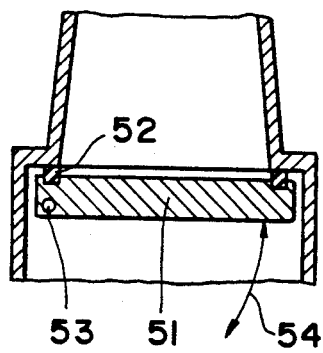
FIGS. 19-23 show diagrammatic representations of further exemplary embodiments of the gaskets both with flap valves and with slide valves.

FIG. 19 shows a flap valve embodiment 51 with hollow gasket 52 inserted in it, in which the pivot movement around the hinge or the like 53 is here shown by double arrow 54.

Figure 20:
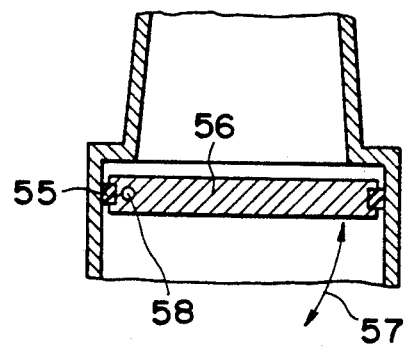

FIG. 20 illustrates a peripheral gasket 55 with a flap valve construction 56. The pivot movement (arrow 57) of the flap valve is simplified in this case, because gasket 55 can be drawn back into its storage recess 58 as soon as its hollow space becomes devoid of pressure.

Figure 21:
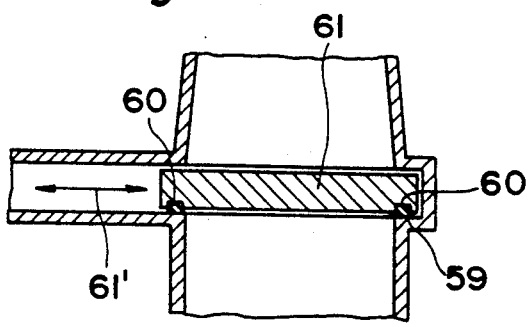

With the variation of FIG. 21, an annular or rectangular hollow gasket 59 which is self-contained is arranged in a groove 60 on the bottom of a slide valve 61. Following release of the pressure of the hollow gasket or of the hollow space of the gasket, the elastic gasket is drawn into groove 60, in which it can be anchored, held back entirely or partially, so that the slide valve movement can be executed without difficulty, as is shown by the double arrow 61'.

Appropriately elastically formed hollow gaskets anchored in grooves also facilitate the sliding and pivoting motions in the embodiments described above when the pressure medium is more or less evacuated from the cavity of the gasket.

Figure 22:
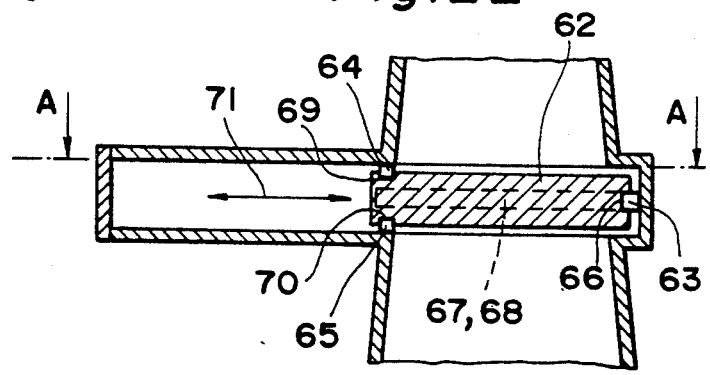
Figure 23:
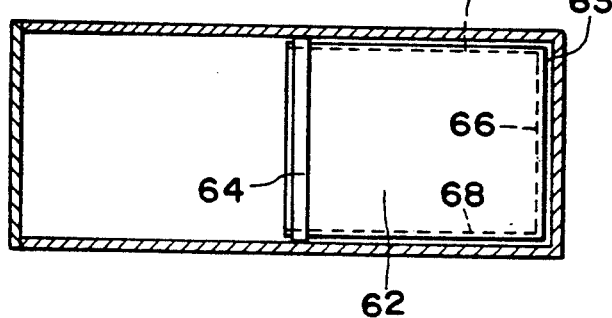

FIGS. 22 and 23 show another construction with a slide valve 62 shown diagrammatically in longitudinal section (FIG. 22) and in transverse section along the plane A—A of FIG. 22 (FIG. 23). In this case, the hollow gasket is constructed of an approximately U-shaped part 63 and two rod-like members 64 and 65.

The U-shaped part 63 rests in a front groove 66 and in side grooves 67, 68 of slide valve 62. The rod-like hollow gasket members 64, 65 rest in corresponding grooves 69, 70 on the top and bottom of the slide valve, which is moved in the directions of double arrow 71. Hollow gasket parts 63–65 are again in connection with a pressure medium source. Functioning in practical cooperation, gasket parts 63–65 yield a sufficiently tight sealing for operation.

Material can be transported through the chamber constructed according to the invention both in the direction of a drop in pressure and also in the direction of a rise in pressure.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A device for transport of material between chambers at different pressures, comprising:
    a feed chamber;
    a main chamber defining a material passage, said main chamber having an upper housing with an inlet and a lower housing with an outlet, said feed chamber coupled to said main chamber at said inlet;
    a first slide valve means for opening and closing said inlet;
    a second slide valve means for opening and closing said outlet;
    a first laterally disposed slide valve chamber in said upper housing, said first slide valve means being movable within said first slide valve chamber;
    a second laterally disposed slide valve chamber in said lower housing, said second slide valve means being movable within said second slide valve chamber;
    at least one first flexible, endless, inflatable, hollow gasket means with a completely closed wall coupled between said upper housing and said first slide valve means outwardly spaced from said material passage for sealing said inlet and said slide valve in the closed position;
    at least one second flexible, endless, inflatable, hollow gasket means with a completely closed wall coupled between said lower housing and said second slide valve means outwardly spaced from said material passage for sealing said slide valve in the closed position and said outlet;
    a pressure medium source communicating with each said hollow gaskets for introducing a pressure medium to said hollow gaskets;
    a shut-off device coupled between said pressure medium source and said hollow gaskets for opening and closing said hollow gaskets;
    first endless scraper means completely surrounding said material passage and being positioned in said first slide valve chamber between said material passage and said first hollow gasket and having at least one side wall facing said hollow gasket;
    each of said slide valve chambers having a pair of opposing side walls disposed opposite said slide valve means, one of said walls of said slide valve chambers having a recess with side walls;
    said first endless scraper means being positioned in said recess and being supported by a side wall of said recess facing said hollow gasket.

2. A device according to claim 1, wherein said pressure medium is pressurized air.

3. A device according to claim 1, further comprising pressurizing means for varying the pressure in said main chamber.

4. A device according to claim 1, wherein said first slide valve means comprises
    a valve body;
    a hydraulically actuated piston coupled to said valve body for sliding said valve body across said inlet; and
    guide means for guiding said valve body in a linear path.

5. A device according to claim 1, wherein said second slide valve means comprises
    a valve body;
    a hydraulically actuated piston coupled to said valve body for sliding said valve body across said outlet; and
    guide means for guiding said valve body in a linear path.

6. A device according to claim 1, wherein said first slide valve means comprises a one-piece slide valve body.

7. A device according to claim 1, wherein said second slide valve means comprises a one-piece slide valve body.

8. A device according to claim 1, wherein said at least one first gasket sealing said inlet is annular and surrounds said inlet.

9. A device according to claim 1, wherein said at least one second gasket sealing said outlet is annular and surrounds said outlet.

10. A device according to claim 1, wherein said first scraper means comprises
    an annular, resiliently mounted, adjustable scraper ring.

11. A device according to claim 10, wherein said first scraper means further comprises
    a plurality of adjustment bolts coupled to said scraper ring and extending through said upper housing;
    said bolts being sealed to said upper housing.

12. A device according to claim 10, wherein said first scraper means further comprises
    an inflatable hose coupled to said scraper ring for resiliently mounting said ring to said upper housing.

13. A device according to claim 1, further comprising a second scraper means, coupled to said lower housing, between said outlet and said second gasket means for sealing said outlet, for scraping said second slide valve means when said second slide valve means is slid open.

14. A device according to claim 13, wherein said second scraper means comprises
    an annular, resiliently mounted, adjustable scraper ring.

15. A device according to claim 14, wherein said second scraper means further comprises a plurality of adjustment bolts coupled to said scraper ring and extending through said lower housing;
    said bolts being sealed to said lower housing.

16. A device according to claim 14, wherein said second scraper means further comprises
an inflatable hose coupled to said scraper ring for resiliently mounting said ring to said lower housing.

17. A device according to claim 1, further comprising
third scraper means coupled to said upper housing, with said gasket means disposed between said inlet and said scraper means.

18. A device according to claim 17, wherein said third scraper means comprises
a resiliently mounted adjustable scraper blade;
a recess in said upper housing communicating with said scraper blade; and
rinsing means coupled to said recess for flushing scraped residue from said recess.

19. A device according claim 1, further comprising
fourth scraper means coupled to said lower housing, with said gasket means for sealing said outlet disposed between said outlet and said scraper means.

20. A device according to claim 19, wherein said fourth scraper means comprises
a resiliently mounted adjustable scraper blade;
a recess in said lower housing communicating with said scraper blade; and
rinsing means coupled to said recess for flushing scraper residue from said recess.

21. A device according to claim 1, wherein at least one of said valve means comprises
a valve body with a beveled leading edge turned toward said main chamber.

22. A device according to claim 1, wherein at least one of said valve means comprises
a valve body; and
an abrasion plate removable coupled to said valve body.

23. A device according to claim 1, wherein at least one of said valve means comprises
a valve body; and
side guide rollers countersunk in said valve body for guiding said valve body.

24. A device according to claim 1, at least one of said valve means comprises
a valve body having a recess; and
a sealed safety bolt received in said recess for selectively locking said valve body in an open position.

25. A device according to claim 1, further comprising
a ventilation pipe disposed in said main chamber.

26. The device according to claim 1, wherein
said first and second gaskets consist entirely of elastic material.

* * * * *